United States Patent [19]

Line

[11] Patent Number: 5,575,241
[45] Date of Patent: Nov. 19, 1996

[54] ANIMAL EXERCISE AND AMUSEMENT DEVICE

[76] Inventor: Ronnie G. Line, 7747 E. 24th, Tulsa, Okla. 74129

[21] Appl. No.: 520,778

[22] Filed: Aug. 30, 1995

[51] Int. Cl.$^6$ .......................... A01K 15/02; A01K 29/00
[52] U.S. Cl. .......................... 119/708; 119/786; 119/782
[58] Field of Search .................... 119/707, 708, 119/780, 786, 788, 791, 787, 789, 781

[56] References Cited

U.S. PATENT DOCUMENTS

| | | | |
|---|---|---|---|
| D. 245,032 | 7/1977 | Hoffmann | 119/780 X |
| 1,699,308 | 1/1929 | Postings | 119/780 |
| 2,096,078 | 10/1937 | Windson | 119/708 |
| 2,307,905 | 1/1943 | Ament | 119/708 |
| 3,123,052 | 3/1964 | Marshall | 119/789 |
| 3,189,004 | 6/1965 | Sinclair | 119/789 |
| 3,295,499 | 1/1967 | Manchester | 119/708 |
| 3,508,525 | 4/1970 | Sawyer | 119/780 |
| 5,119,001 | 6/1992 | Moore et al. | 318/257 |
| 5,148,769 | 9/1992 | Zelinger | 119/708 |

OTHER PUBLICATIONS

Advertising Supplement to the Washington Post Dec. 8, 1995.

*Primary Examiner*—Robert P. Swiatek
*Assistant Examiner*—Elizabeth Shaw
*Attorney, Agent, or Firm*—Head, Johnson & Kachigion

[57] ABSTRACT

An animal exercise and amusement device includes a vertical post and a hollow shank with an eye that is rotatably attached to the top of the post. One end of a rope or elastic cord is attached through the hollow shank outwardly terminating at the other end with a play toy.

3 Claims, 1 Drawing Sheet

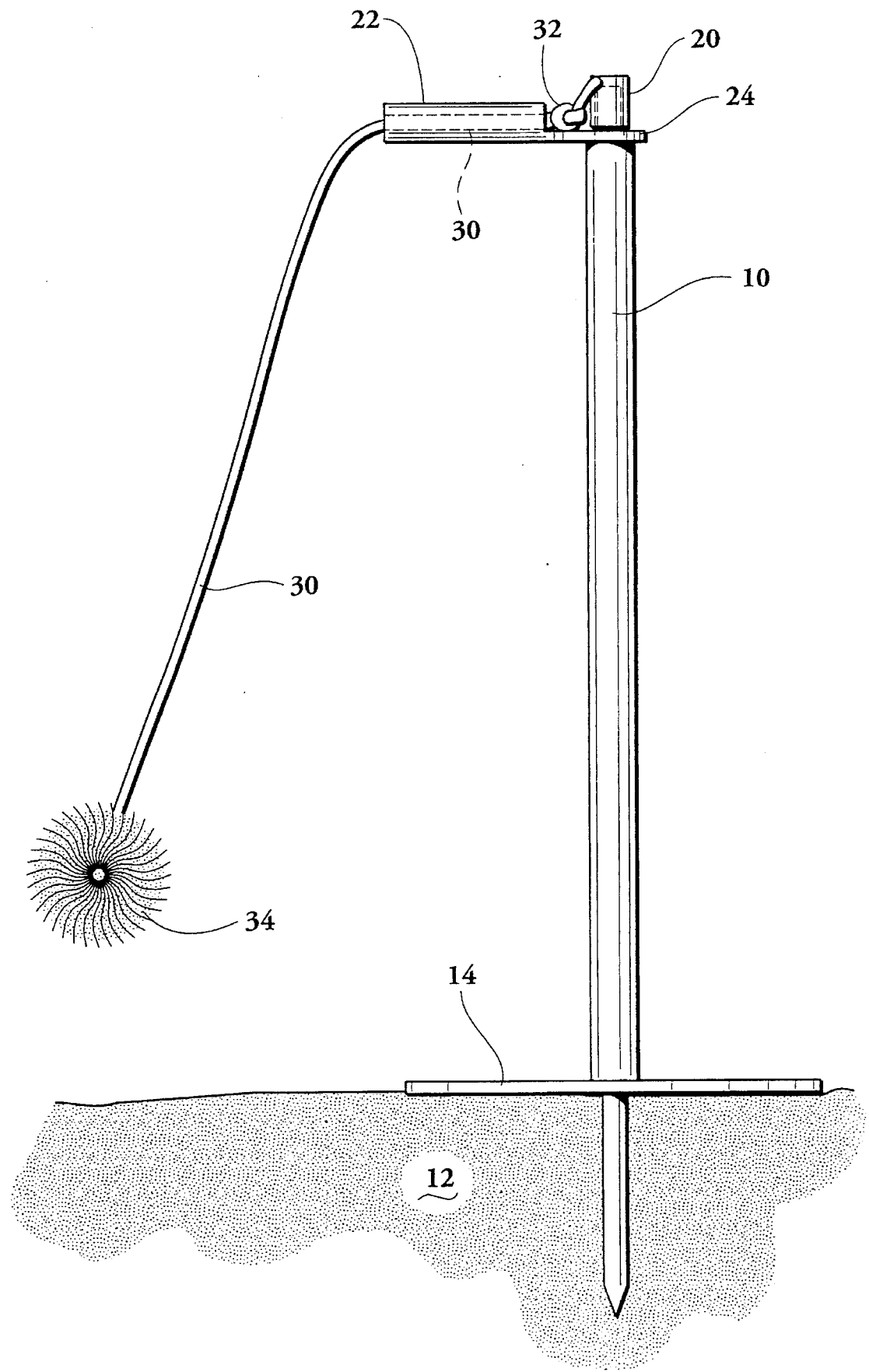

5,575,241

ANIMAL EXERCISE AND AMUSEMENT DEVICE

BACKGROUND OF THE INVENTION

This invention relates generally to an exercise or amusement device for a cat or a dog. Animal exercisers and amusement devices of various descriptions have been known in the art heretofore. In this regard reference is made to the following United States patents:

| | |
|---|---|
| 1,699,308 | Postings |
| 2,096,078 | Windson |
| 2,307,905 | Ament |
| 5,119,001 | Moore et al. |
| 5,148,769 | Zelinger |

The present invention is an improvement over the aforementioned prior art devices.

SUMMARY OF THE INVENTION

This invention provides an exercise, toy or amusement device for cats and dogs wherein a vertical post is either driven into the ground or provided with a stable base or other means of removably mounting the post to other surfaces. A horizontally extending hollow shank terminating with an eye is rotatably retained to the top of the post. A rope or elastic cord has one end retained through and/or to the shank, extending a given length therefrom with the other end terminating in a play toy. The length of the hollow shank is provided so as to extend the elastic cord and the play toy sufficiently away from the vertical post to provide room for play and exercise by the animal.

BRIEF DESCRIPTION OF THE DRAWING

The drawing, partly sectional, depicts the invention.

DETAILED DESCRIPTION

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

Referring to the drawing, vertical post 10 positioned within the ground 12 and includes a disk 14 to provide surface stability to the vertical post. The top of the post includes a threaded nut 20 and shank 22. In this embodiment, the shank is hollow along the horizontal part terminating in an eye 24 which is adapted for rotational movement around the post 10. A rope or elastic cord 30 is retained to or within the hollow shank 22. For example, one end is terminated therein and retained by a knot, or other means, 32. The other end of the elastic cord terminates with a play toy 34.

What is claimed is:

1. An animal exercise and amusement device comprising:

a vertical post;

a shank having an eye rotatably retained to a top of said post, said shank being hollow and extending horizontally outward from said post; and an elastic cord, one end of which is retained in said hollow shank and extending a given length from said shank and terminating at the other end in a play toy.

2. The device of claim 1 wherein said vertical post includes a disk at a bottom end.

3. An animal exercise and amusement device comprising:

a vertical post;

a shank having an eye rotatably retained to a top of said post, said shank being hollow and extending horizontally outward from said post; and a rope, one end of which is retained in said hollow shank and extending a given length from said shank and terminating at the other end in a play toy.

* * * * *